US012599201B2

(12) United States Patent
Bellon et al.

(10) Patent No.: US 12,599,201 B2
(45) **Date of Patent: *Apr. 14, 2026**

(54) PRINTABLE HOOK AND LOOP STRUCTURE

(71) Applicant: Brady Worldwide, Inc., Milwaukee, WI (US)

(72) Inventors: Scott M. Bellon, West Bend, WI (US); Steven Mess, Franklin, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/872,811

(22) Filed: Jul. 25, 2022

(65) Prior Publication Data

US 2022/0354223 A1 Nov. 10, 2022

Related U.S. Application Data

(63) Continuation of application No. 16/821,262, filed on Mar. 17, 2020, now Pat. No. 11,425,970.

(51) Int. Cl.
*A44B 13/00* (2006.01)
*B41J 15/04* (2006.01)

(52) U.S. Cl.
CPC ......... *A44B 13/0029* (2013.01); *B41J 15/044* (2013.01)

(58) Field of Classification Search
None
See application file for complete search history.

(56) References Cited

U.S. PATENT DOCUMENTS 4,656,767 A 4/1987 Tarrant
5,496,282 A 3/1996 Militzer et al.
(Continued)

FOREIGN PATENT DOCUMENTS

DE 202004012826 U1 10/2004
DE 202015002292 U1 5/2015
(Continued)

OTHER PUBLICATIONS

Amazon, Wrap-It Storage Cinch-Straps Product Information, https://www.amazon.com/Wrap-Storage-Cinch-Straps-Identification-Multi-Purpose/dp/B07Z9MT34P/ref=psdc_6577540011_t3_B071FDY9H3?th=1, Listed on Amazon on Nov. 8, 2019, 5 pages.
(Continued)

*Primary Examiner* — Matthew G Marini
(74) *Attorney, Agent, or Firm* — Quarles & Brady LLP

(57) ABSTRACT

A printable structure is configured to create a temporary bind as one half of a hook and loop connection with another half of the hook and loop connection. The printable structure includes a substrate, an adhesive layer, and a print-receptive topcoat. The substrate has two opposing surfaces including a fastening surface that is one of a hook fastening surface and a loop fastening surface of the hook and loop connection and including a textured surface that is textured with surface relief in a direction parallel to a direction of thickness of the printable structure. The adhesive layer is coupled to the textured surface of the substrate. The print-receptive topcoat is coupled to the adhesive layer on a side opposite the substrate. The adhesive layer fills in the surface relief such that there are no un-filled gaps beneath the print-receptive topcoat to level the print-receptive topcoat.

20 Claims, 4 Drawing Sheets

(56) References Cited

U.S. PATENT DOCUMENTS

| | | | |
|---|---|---|---|
| 5,697,177 A | 12/1997 | Ludlow et al. | |
| 6,684,464 B1 | 2/2004 | Mody et al. | |
| 7,160,600 B2 | 1/2007 | Shepard et al. | |
| 7,465,695 B2 | 12/2008 | Tischer et al. | |
| 8,061,069 B1 | 11/2011 | Joseph | |
| 8,387,293 B2 | 3/2013 | Wanibuchi | |
| 8,549,714 B1 | 10/2013 | Shepard et al. | |
| 8,714,471 B2 | 5/2014 | Suva | |
| 9,126,453 B2 | 9/2015 | Takashima et al. | |
| 9,330,579 B2 | 5/2016 | Weinstein | |
| 10,242,600 B1 | 3/2019 | Valenti, Jr. et al. | |
| 2004/0058121 A1 | 3/2004 | Schriefer et al. | |
| 2005/0166372 A1 | 8/2005 | Shepard et al. | |
| 2005/0181352 A1 | 8/2005 | Shephard et al. | |
| 2006/0137076 A1 | 6/2006 | Vaughn et al. | |
| 2007/0114789 A1 | 5/2007 | Morrish | |
| 2009/0084311 A1 | 4/2009 | Yoshida et al. | |
| 2011/0117020 A1 | 5/2011 | Vinogradov et al. | |
| 2012/0175424 A1 | 7/2012 | Saint et al. | |
| 2012/0198738 A1* | 8/2012 | Olivarez | G09F 3/0295 156/185 |
| 2017/0238645 A1 | 8/2017 | Arin | |
| 2018/0228256 A1 | 8/2018 | Dekwiatkowski | |
| 2021/0289891 A1 | 9/2021 | Bellon et al. | |

FOREIGN PATENT DOCUMENTS

| | | | | |
|---|---|---|---|---|
| DE | 202018103762 U1 | 9/2018 | | |
| JP | 2003193308 A | 7/2003 | | |
| JP | 5028622 B2 | 9/2012 | | |
| KR | 920001481 B1 | 2/1992 | | |
| WO | 2004017781 A1 | 3/2004 | | |
| WO | 2004019305 A1 | 3/2004 | | |
| WO | WO-2010054182 A1 * | 5/2010 | B41J 15/044 | |
| WO | 2014008538 A1 | 1/2014 | | |
| WO | 2014099731 A1 | 6/2014 | | |
| WO | WO-2015095525 A1 * | 6/2015 | A44B 18/0011 | |

OTHER PUBLICATIONS

Cablenet, 20mm×70mm 715pcs Roll Velcro Brand One-Wrap Write on Labels White, https://www.cabelines.com/product/20mm-x-70mm-715pcs-roll-velcro-one-wrap-write-on-labels-white-vel-label/category/velcro-one-wrap-strap, Copyright 2019 Cablenet Ltd., 2 pages.

Envisioned Products, Inc., Replacement Cable Tags ½"×2" White Labels Writable 50 Pack for Use on All Types of Hook and Loop Cable Ties and Most Types of Velour Fabric Material—Includes Bonus Permanent Marker, May 1, 2017, https://www.amazon.com/Replacement-Labels-Writable-Velcro-Material/dp/B071FDY9H3?th=1, 9 pages.

European Patent Office, Extended Search Report, Application No. 21162596.7, Aug. 4, 2021, 9 pages.

Mr-Label Unique Writable Cable Ties—Reusable Fastening Cable Straps, https://www.amazon.com/Mr-Label-Unique-Writable-Cable-Strap/dp/BO1M9ILXZL?th=1, First Available: Nov. 1, 2016, 7 pages.

* cited by examiner

PRINTABLE HOOK AND LOOP STRUCTURE

CROSS-REFERENCE TO RELATED APPLICATIONS

This application is a continuation application of U.S. Non-Provisional patent application Ser. No. 16/821,262 filed Mar. 17, 2020; the contents of which application is hereby incorporated by reference for all purposes as if set forth in its entirety herein.

TECHNICAL FIELD

This disclosure relates to hook and loop structures that can be used, for example, for securing wire bundles.

BACKGROUND

Hook and loop type connections are well known within the state of the art and for their use in forming reversible, but strong attachments. Hook and loop attachment structures are often used as straps to secure a bundle or set of elongated items. For example, such strap systems may be used for securing cables, wires, and so forth. In general, hook and loop straps include a double-sided material with fastening hooks on one surface and fastening loops on the opposite surface that are configured to engage one another and create a temporary bind when the strap is wrapped upon itself to form a loop.

When such a bundle of wires or other objects is formed, it is often desirable to mark or label the bundle. However, while the aforementioned hook and loop straps provide a robust way to secure a bundle, they are often not well-suited for marking or labeling. Often times when marking is needed, a user may instead employ a cable tie with a flag portion. However, such cable ties are restrictive in that they cannot be non-destructively removed and further still require the step of writing on the flag or affixing a label. Moreover, solutions exist in which a hook and loop structure can include a writeable surface or a surface receptive for an adhesive printed label. However, such solutions either entail handwriting on the writeable surface or printing and then adhering a label, which is time consuming and laborious.

SUMMARY

Disclosed herein is an improved label structure for hook and loop type systems in which the label includes a surface receptive for machine printing (for example, thermal heat transfer printing, but could also be direct thermal or inkjet printing as some non-limiting examples) and that is received on a substrate including one half of a hook and loop structure prior to printing. Such a label structure, after being printed upon using a printer, may be then attached to another hook and loop structure such as a hook and loop type wrap or strap with an exposed hook or loop surface. Many advantages can flow from such a design. For one, it makes it possible to machine print unique information onto a hook and loop type substrate, which has otherwise been perceived to be difficult to feed through a printer and print upon based on its relative thickness in comparison to other media materials such as paper or adhesive-based labels. Still further, the label structure may be provided as part of a continuous length or strip of media receivable into a cartridge that is itself receivable in a printer and then cut to length after the printing has occurred. This creates great economy and efficiency, as existing labels or markers for hook and loop type connections are understood to either require the manual handwriting of any labeling or marking or require printing onto a different material such as an adhesive label before subsequently attaching or affixing the adhesive label to another structure (e.g., an available surface a hook and loop structure that is also receptive to an adhesive label).

In one aspect, a printable hook and loop engaging structure is disclosed herein. The printable structure is configured to create a temporary bind as one half of a hook and loop connection with another half of the hook and loop connection. The printable structure includes a substrate and a print-receptive topcoat coupled to the substrate. The substrate includes a fastening surface that is one of a hook fastening surface and a loop fastening surface of the hook and loop connection. While either a hook fastening surface or a loop fastening surface might be used, the hook fastening surface is believed to likely be workable in practice. The print-receptive topcoat is opposite from the fastening surface of the substrate.

In some forms, the printable structure can define a thickness that is dimensioned to be received by a printer. For example, the thickness may be between 2 mils and 80 mils.

In some forms, the printable structure may further include an adhesive layer that is received on the side of the substrate that is opposite the fastening surface. The adhesive layer can bind the substrate to the print-receptive topcoat. Further, the printable structure may include a polymer film that is disposed between the adhesive layer and the print-receptive topcoat.

In some forms, the print-receptive topcoat may be thermal heat transfer printable. It is contemplated that the side of the substrate opposite the fastening surface can be textured with surface relief in a direction that is parallel to the direction of the thickness of the printable structure. In such case, the adhesive layer may advantageously fill in the surface relief such that the print-receptive topcoat is leveled to facilitate the application of even pressure upon thermal heat transfer printing of the printable structure.

Additionally, in some forms, the printable structure may be configured as a flexible band that is configured to be rolled into a spiral. The spiral roll may be inserted into a cartridge that is receivable by a printer as a consumable item. Such printer might be, for example, a thermal heat transfer printer, but might be other kinds of printers including inkjet printers, direct thermal printers, and so forth.

In another aspect, a hook and loop fastening system for securing elements is disclosed. The hook and loop fastening system includes a securing portion and a labeling portion. The securing portion is configured as a strap that includes a hook fastening surface and a loop fastening surface. The hook fastening surface is configured to create a temporary bind with the loop fastening surface when the hook fastening surface engages the loop fastening surface. The labeling portion includes a printable structure that is dimensioned to be received by a printer. The labeling portion includes a fastening surface that is configured to engage at least one of the hook fastening surface and the loop fastening surface of the securing portion. Such engagement creates a temporary bind between the fastening surface of the labeling portion and the securing portion.

In some forms, the printable structure may include a thermally printable surface. The thermally printable surface may be part of a facesheet. The facesheet may include a thermal heat transfer-receptive topcoat and a polymer film. The printable structure may further include a fastener substrate that includes a fastening surface. An adhesive may adhere the facesheet to the fastener substrate on a surface opposite the fastening surface.

In some forms, the labeling portion of the hook and loop fastening system may define a thickness. The thickness may be defined as an orthogonal segment between the thermally printable surface and the fastening surface. The thickness may be between 2 mils and 80 mils.

In some forms, the fastening surface of the labeling portion may be configured as a second hook fastening surface that is configured to engage the loop fastening surface of the securing portion. Alternatively, the fastening surface of the labeling portion may be configured as a second loop fastening surface that is configured to engage the hook fastening surface of the securing portion.

In another aspect, a method for producing a printable hook and loop fastening system is disclosed. The method includes producing a substrate that has a fastening surface that is configured to engage with a hook and loop connection, thereby creating a temporary bind. The method further includes applying a facesheet that is machine printable (such as, for example, a thermally printable facesheet) to the substrate, thereby creating a first assembly.

In some forms, the method may further include applying an adhesive layer between the substrate and the facesheet with the facesheet being thermal heat transfer printable. The adhesive may be configured to create a sufficiently smooth surface such that the facesheet may be applied in a substantially even surface relief such that the facesheet is leveled to facilitate the application of even pressure upon thermal heat transfer printing of the printable hook and loop fastening system. The facesheet may further include a polymer film layer in contact with the adhesive layer and a thermal heat transfer-receptive topcoat.

In still another aspect, a method is disclosed for printing on a printable structure that is configured to create a temporary bind as one half of a hook and loop connection with another half of the hook and loop connection. The method includes feeding the printable structure through a printer. The method further includes printing on a print-receptive topcoat of the printable structure that is on an opposite side from a fastening surface that is one half of the hook and loop connection.

In some forms, the printable structure may be fed into the printer from a cartridge. The printer may take many forms including a thermal heat transfer printer, a direct thermal printer, an inkjet printer, or other kinds of printers.

In some forms, the method for printing on a printable structure may further include severing a portion of the printable structure after printing on the print-receptive topcoat.

In some forms, the method may further include attaching the printable structure to a securing portion that includes a hook fastening surface and a loop fastening surface.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
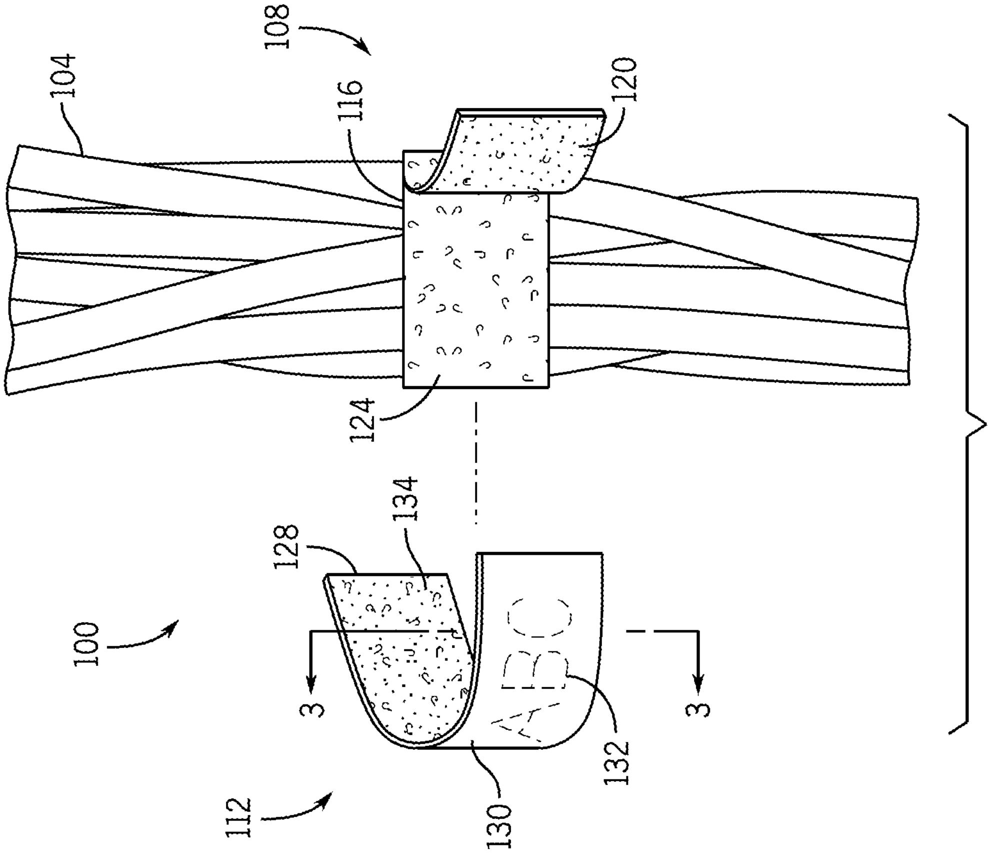
FIG. 2 is an exploded view of the hook and loop fastening system of FIG. 1.
Figure 1:
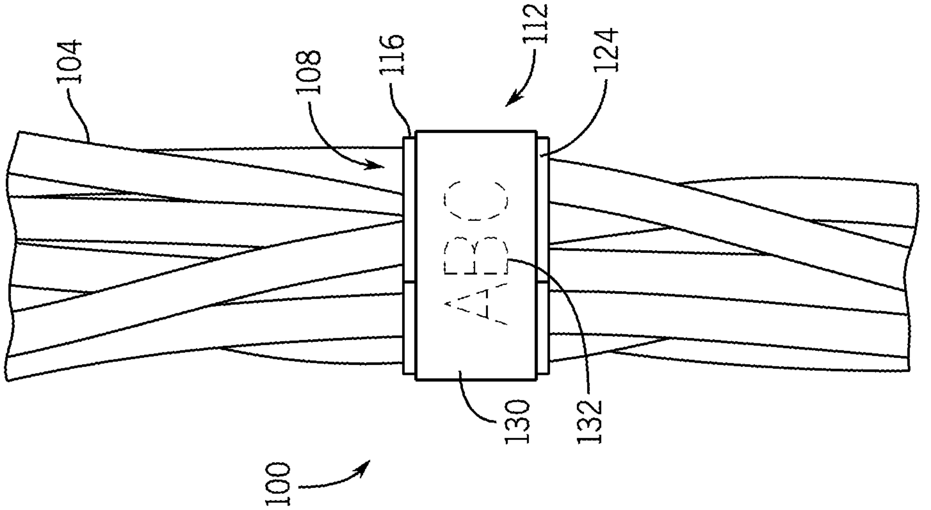
FIG. 1 is a front assembly view of a hook and loop fastening system that includes a securing portion and a labeling portion.

Referring first to FIGS. 1 and 2, a hook and loop fastening system 100 is shown. In the illustrated embodiment, the hook and loop fastening system 100 is used to secure and label a bundle of wires 104; however, other configurations are possible. For example, the hook and loop fastening system 100 may be configured to secure and/or label a number of essentially longitudinal objects, such as, cables, wires, pens, skis, pipes, poles, golf clubs, and so forth. The hook and loop fastening system 100 includes a securing portion 108 and a labeling portion 112.

In the illustrated embodiment, the securing portion 108 is configured as a strap 116 that has a hook fastening surface 120 and a loop fastening surface 124 (see, for example, FIG. 2). The hook fastening surface 120 and the loop fastening surface 124 are configured to create a hook and loop connection, such that each of the hook fastening surface 120 and the loop fastening surface 124 are one half of the hook and loop connection. As shown, the strap 116, which is flexible, is wrapped around the wires 104 such that the loop fastening surface 124 faces away from the wires 104 and the hook fastening surface 120 faces toward the wires 104. As such, a roughly spiral formation is formed by the strap 116 and the hook fastening surface 120 engages the loop fastening surface 124 to create a temporary bind. It should be understood that in other embodiments, the hook fastening surface 120 may face away from the wires 104 and the loop fastening surface 124 may face toward the wires 104.

FIG. 2 illustrates the labeling portion 112 separated from the securing portion 108. In use, the labeling portion 112 may be selectively removed from or attached to the securing portion 108. In the illustrated embodiment, the labeling portion 112 is configured as a machine printable structure and includes a substrate 128 and a facesheet 130. As used herein, "machine printable" refers to printing performed by a machine or printer rather than by manual handwriting by a person using a pen, pencil, marker, or the like. As shown, the facesheet 130 includes indicia 132. The illustrated indicia 132 is shown by way of example and, in use, may include numbers, words, symbols, logos, or any other kind of indicia or combinations thereof that is selected during a printing process.

The substrate 128 includes a fastening surface 134 that may be configured as one half of a hook and loop connection. In the illustrated embodiment, the fastening surface 134 is configured as a hook fastening surface such that a temporary bind can be created between the labeling portion 112 and the securing portion 108 via the engagement of the fastening surface 134 of the labeling portion 112 and the loop fastening surface 124 of the securing portion 108. In another embodiment, the fastening surface 134 may be configured to engage and bind with a variety of other surface materials, such as fabric, for example. In other embodiments, the fastening surface 134 may be a loop fastening surface and configured to bind with the hook fastening surface 120 of the securing portion 108.

Figure 3:
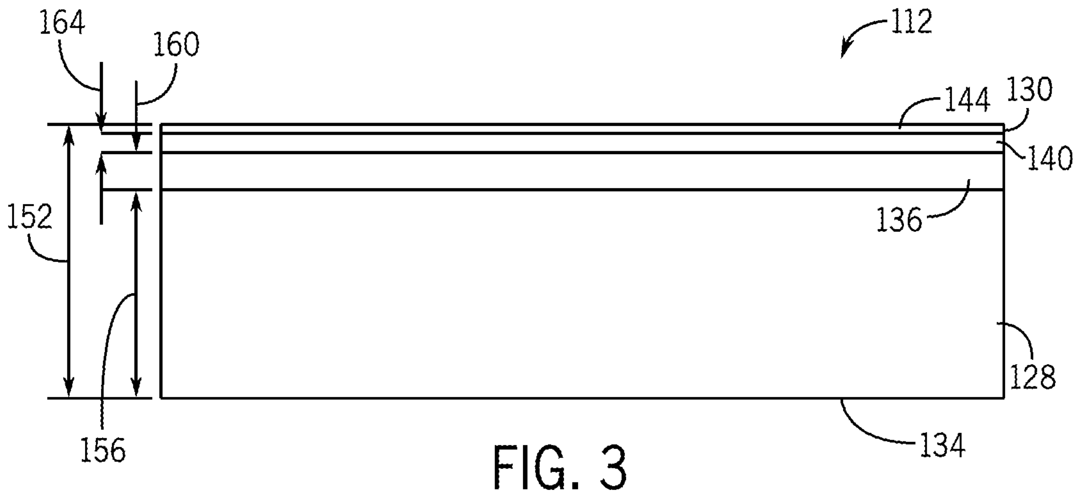
FIG. 3 is a cross sectional side view of the labeling portion taken along the line 3-3 of FIG. 2 that schematically illustrates the layers of the labeling portion.

As illustrated in FIG. 3, one embodiment of the labeling portion 112 further includes an adhesive layer 136 that binds the facesheet 130 to the substrate 128. As shown, the facesheet 130 includes a polymer film 140 and a print-receptive topcoat 144. The adhesive layer 136 is received by a textured surface 148 of the substrate 128 on the side of the substrate 128 opposite the fastening surface 134. The textured surface 148 will be described in further detail below, with respect to FIG. 4. In the illustrated embodiment, the adhesive layer 136 binds the substrate 128 to the polymer film 140, which is coated with the print-receptive topcoat 144. In the example shown, the print-receptive topcoat 144 is thermal heat transfer printable. In other embodiments, the print-receptive topcoat 144 may be receptive to additional or alternative print-types, such as, for example, direct thermal printing, laser printing, and ink printing. In such cases, a corresponding printer type (for example, a thermal heat transfer printer, direct thermal printer, laser printer, or inkjet printer) may be employed during printing.

Further illustrated in FIG. 3, the labeling portion 112 defines a thickness 152. The thickness 152 is defined by an orthogonal dimension or segment between oppositely facing surfaces of the print-receptive topcoat 144 and the fastening surface 134. The thickness 152 is dimensioned to be received by a printer and also facilitate flexibility of the labeling portion 112. The printer may be, for example, a thermal heat transfer printer, a direct thermal printer, a laser printer, an ink jet printer, or any suitable printer type. The thickness 152 may be between about 2 mils and about 80 mils, or between about 10 mils and about 35 mils, or about 15 mils.

The substrate 128 may have a substrate thickness 156 between about 2 mils and about 20 mils, or about 6 mils to about 14 mils, or about 12 mils. Additionally, the adhesive layer 136 may have an adhesive layer thickness 160 between about 0.1 mils and 6 mils, or between about 1 mil and 3 mil, or about 2 mils. Finally, the polymer film 140 may have a film thickness 164 between about 0.1 mils and 6 mils, or between about 0.5 mils and 2 mils, or about 1 mils.

In the illustrated embodiment, the adhesive layer thickness 160 is sufficiently thick to enable printing. Specifically, the adhesive layer 136 provides a surface such that the print-receptive topcoat 144 may be applied evenly and sufficiently leveled to facilitate the application of even pressure during, for example, thermal heat transfer printing of the labeling portion 112 in which the ability to apply even pressure will improve print quality.

In other embodiments, the polymer film 140 may be print-receptive, and in particular, compatible with thermal heat transfer printing in cases where a thermal heat transfer printer is employed, such that the print-receptive topcoat 144 may be omitted as part of the facesheet 130. In other embodiments, the substrate 128 may be alternatively modified to allow print-receptivity, such as, for example, by applying a topcoat directly to the substrate 128. In other embodiments still, the substrate 128 may receive a surface modification, such as, for example, chemical etching, to provide a print-receptive surface.

One example of a method of producing the labeling portion 112 of the hook and loop fastening system 100 includes producing the substrate 128 that has the fastening surface 134 on a first side, and the textured surface 148 on an opposing second side. The adhesive layer 136 may then be applied to the textured surface 148 thereby creating a smooth surface for the facesheet 130 to engage. With an intermediate adhesive, the facesheet 130 may then be applied in a more even of level manner (i.e., not have un-filled gaps beneath the print receptive layer by virtue of surface texturing of the substrate) so to facilitate the application of even pressure during thermal heat transfer printing or other types of printing. The facesheet 130 may be applied to the adhesive layer 136 as a single layer. Alternatively, the facesheet 130 may be applied to the adhesive layer 136 in multiple layers. For example, the polymer film 140 may be applied to the adhesive layer 136 and then coated with the print-receptive topcoat 144.

Figure 4:
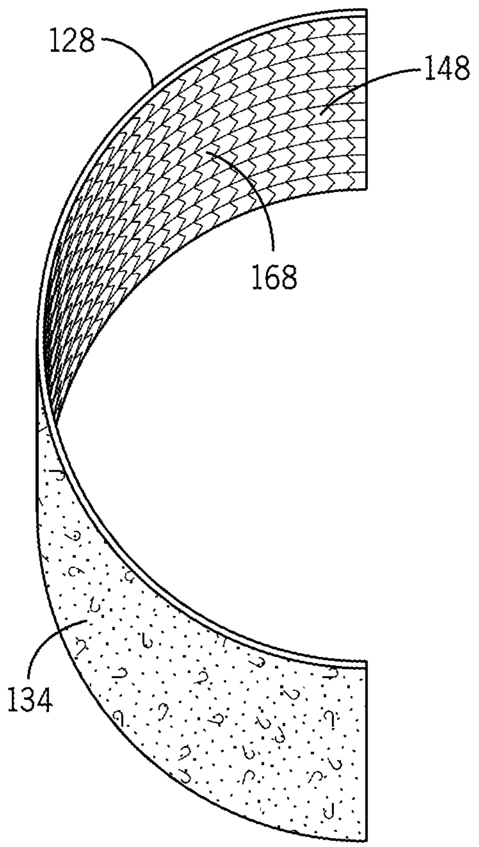
FIG. 4 is a perspective view of a fastener substrate illustrating a fastening side and a textured side for reception of the topcoat.

Referring now to FIG. 4, the textured surface 148 of the substrate 128 is textured with a surface relief 168 in a direction parallel to the thickness of the labeling portion 112. As noted above, the surface relief 168 is dimensioned to receive the adhesive layer 136 such that the adhesive layer 136 fills in voids of the surface relief 168. This texturing can help provide an improved adhesive bond with the top layers (as opposed to a non-textured planar surface). When applied evenly, the application of adhesive also provides a leveled surface for receiving the print-receptive topcoat 144 as discussed above to improve print receptiveness. In one embodiment, the textured surface 148 is corona treated; however, other techniques may also be employed. For example, additional or alternative plasma surface modification treatments may be used. The pattern of the surface relief 168 illustrated in FIG. 4 is shown by way of example, and it should be understood that additional or alternative shapes and configurations of a surface relief, or lack thereof, are possible.

Figure 5:
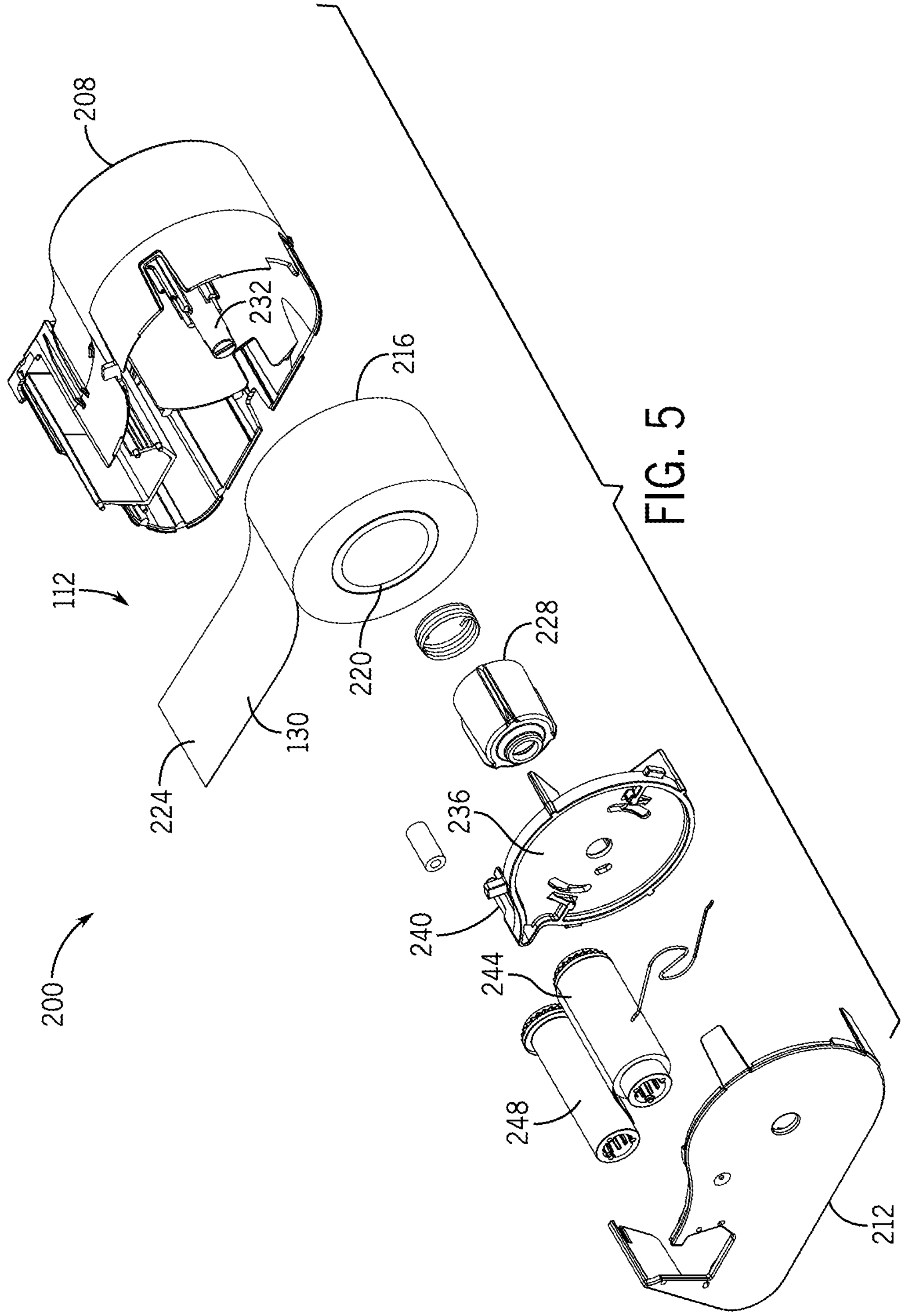
FIG. 5 is an exploded isometric view of a cartridge assembly.
Figure 6:
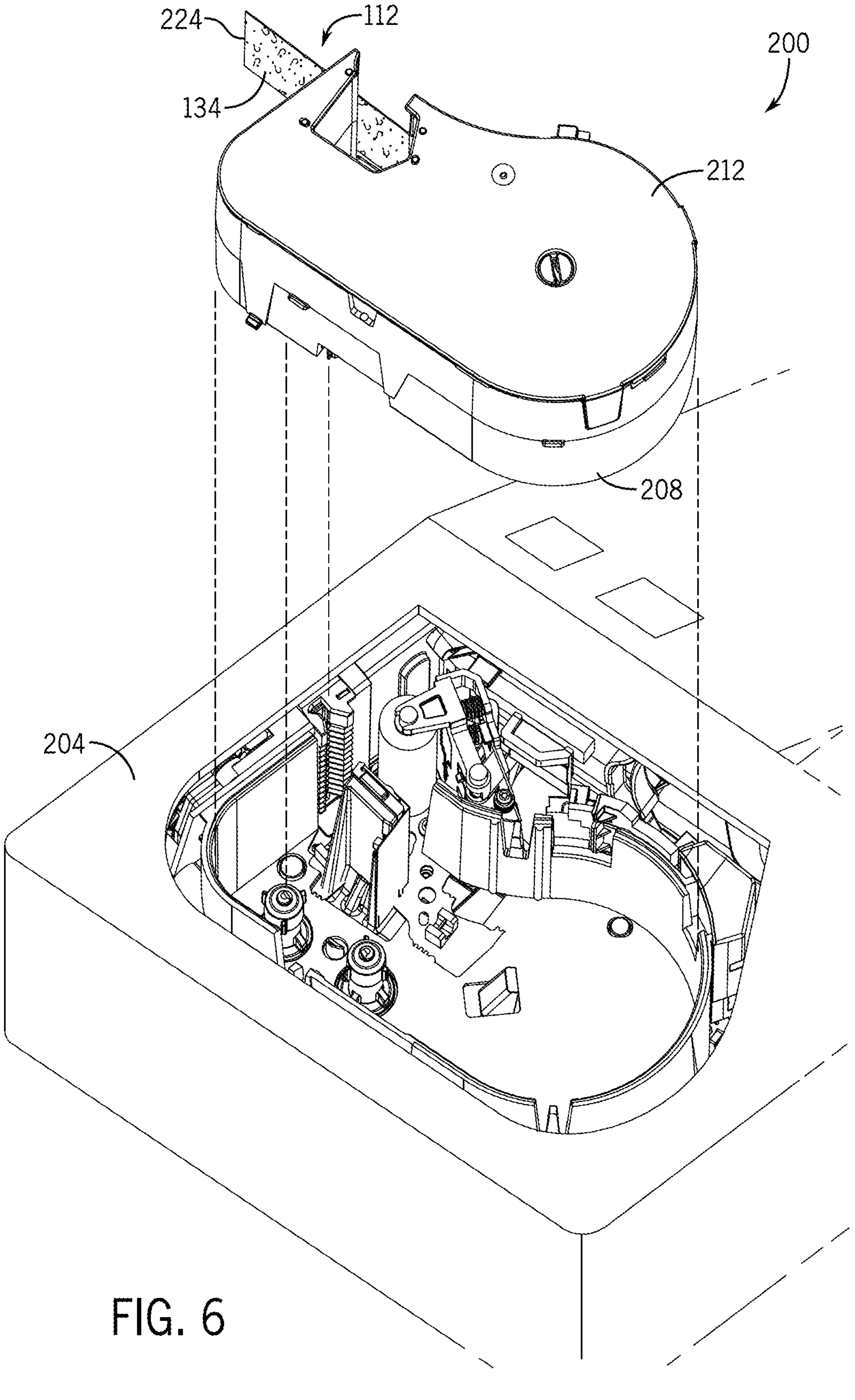
FIG. 6 is an exploded view of a printer and the cartridge assembly of FIG. 5.

Referring now to FIGS. 5 and 6, a cartridge assembly 200 for use with a printer 204, such as a thermal heat transfer printer, is shown. The cartridge assembly 200 includes a first housing portion 208 and a second housing portion 212 that define a cavity. The cavity is dimensioned to receive a length or strip of the labeling portion 112, which, in the illustrated example, is configured as a roll 216. The thickness 152 enables the labeling portion 112 to achieve substantial flexibility such that the labeling portion 112 can be rolled into a spiral. The roll 216 may be wrapped around a tubular central core 220 such that the roll 216 has a free end 224 that extends therefrom. The length of the labeling portion 112 within the roll 216 may be a continuous unbroken length that can be cut using a guillotine cutter, or the like, at an exit from the cavity or the printer 204. In other embodiments, there may be perforations or lines of material weakness formed along the length of the labeling portion 112 so that, after printing, the printed part of the labeling portion 112 may be separated from the roll 216.

The cartridge assembly 200 further includes a core holder 228 configured to engage the tubular central core 220. The core holder 228 is received by a shaft 232 within the first housing portion 208. The cartridge assembly 200 also includes a clutch plate 236 located adjacent to the roll 216 and also received by the shaft 232. The clutch plate 236 includes a pinch arm 240 that can pinch the free end 224 and prevent the free end 224 from retracting into the internal cavity of the first and second housing portions 208, 212. The cartridge assembly 200 further includes a first and second ink ribbon spools 244, 248 that may be used in the thermal heat transfer printing process to support the ink ribbon. However, in cases where other types of printers are used, such an ink ribbon may not be necessary or employed.

Although a number of different cartridge assemblies can be used, additional details and embodiments of the cartridge assembly 200 described above can be the types described in U.S. Pat. No. 8,714,471 entitled "Friction Core Brake," issued on May 6, 2014, and European Patent 2370262 entitled "Cartridge Media Retention Mechanism," issued on Jul. 24, 2013, which are hereby incorporated by reference for their description of these types of assemblies.

In use, according to one embodiment, the roll 212 may be inserted into the cavity of the cartridge assembly 200. The cartridge assembly may then be inserted into the printer 204. The free end 224 of the roll 216 may be then fed into the printer 204 via the cartridge assembly 200. The printer 204 may then proceed with printing on the print receptive topcoat 144 of the labeling portion 112. After printing, the printed portion of the labeling portion 112 may be severed, or otherwise separated from the roll 216. The separated portion may then be attached to the securing portion 108, thereby assembling the hook and loop fastening system 100. In other embodiments, the cartridge assembly 200 may be omitted and the labelling portion 112 may be fed directly into a printer or provided as a cartridge-less roll installed into a printer to print a printed portion of the labelling portion, which may then be attached to the securing portion 108.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A printable structure configured to create a temporary bind as one half of a hook and loop connection with another half of the hook and loop connection, the printable structure comprising:

(A) a substrate having two opposing surfaces including
  (i) a fastening surface that is one of a hook fastening surface and a loop fastening surface of the hook and loop connection; and
  (ii) a textured surface that is textured with surface relief in a direction parallel to a direction of thickness of the printable structure;
(B) an adhesive layer coupled to the textured surface of the substrate; and
(C) a print-receptive topcoat coupled to the adhesive layer on a side opposite the substrate;
wherein the adhesive layer fills in the surface relief such that there are no un-filled gaps beneath the print-receptive topcoat to level the print-receptive topcoat.

2. The printable structure of claim 1, wherein the printable structure has a thickness dimensioned to be received by a printer and the thickness is from 10 mils to 35 mils.

3. The printable structure of claim 1, wherein the adhesive layer has a thickness of from 0.1 mils to 6 mils.

4. The printable structure of claim 1, wherein the print-receptive topcoat is selected from the group consisting of thermal heat transfer printable, direct thermal printable, laser printable, inkjet printable, and combinations thereof.

5. The printable structure of claim 1, further comprising a polymer film disposed between the adhesive layer and the print-receptive topcoat in which the adhesive layer binds to the polymer film.

6. The printable structure of claim 5, wherein the polymer film has a thickness of from 0.1 mils to 6 mils.

7. The printable structure of claim 1, wherein the substrate has a thickness of from 2 mils to 20 mils.

8. The printable structure of claim 1, wherein the printable structure is a flexible band configured to be rolled into a spiral.

9. The printable structure of claim 1, wherein the fastening surface is the hook fastening surface.

10. A cartridge for reception in a printer, the cartridge comprising:
a cartridge body; and
a roll of the printable structure of claim 1.

11. A hook and loop fastening system for securing elements, the fastening system comprising:
a securing portion configured as a strap that includes a hook fastening surface and a loop fastening surface, the hook fastening surface configured to create a temporary bind with the loop fastening surface when the hook fastening surface engages the loop fastening surface; and
a labeling portion comprising the printable structure of claim 1, wherein the printable structure is dimensioned to be received by a printer and the fastening surface is configured to engage at least one of the hook fastening surface and the loop fastening surface of the securing portion, thereby creating a temporary bind with the at least one of the hook fastening surface and the loop fastening surface of the securing portion.

12. A method of printing on a printable structure that is configured to create a temporary bind as one half of a hook and loop connection with another half of the hook and loop connection, the method comprising:

feeding the printable structure of claim 1 through a printer; and printing on the print-receptive topcoat of the printable structure that is on an opposite side from a fastening surface that is one half of the hook and loop connection.

13. The method of claim 12, wherein the printable structure is fed into the printer from a cartridge.

14. The method of claim 12, further comprising:

severing a portion of the printable structure after printing on the print-receptive topcoat and attaching the portion of the printable structure to a securing portion that includes a hook fastening surface and a loop fastening surface.

15. A method for producing a printable hook and loop fastening system, the method comprising:

producing a substrate having two opposing surfaces including (i) a fastening surface that is configured to engage with a hook and loop connection thereby creating a temporary bind and (ii) a textured surface that is textured with surface relief in a direction parallel to a direction of thickness of the substrate;

applying an adhesive layer to the textured surface of the substrate; and applying a facesheet that is machine printable to the adhesive layer on a side opposite the substrate, thereby creating a first assembly in which the adhesive layer binds the substrate to the facesheet and the adhesive layer fills in the surface relief such that there are no un-filled gaps beneath the facesheet to level the facesheet.

16. The method of claim 15, wherein the facesheet includes a polymer film layer in contact with the adhesive layer; and a print-receptive topcoat.

17. The method of claim 15, wherein the facesheet is selected from the group consisting of thermal heat transfer printable, direct thermal printable, laser printable, inkjet printable, and combinations thereof.

18. A printable structure configured to create a temporary bind as one half of a hook and loop connection with another half of the hook and loop connection, the printable structure comprising:

(A) a substrate having two opposing surfaces including (i) a fastening surface that is one of a hook fastening surface and a loop fastening surface of the hook and loop connection; and (ii) a textured surface that is textured with surface relief in a direction parallel to a direction of thickness of the printable structure;

(B) an adhesive layer coupled to the textured surface of the substrate; and (C) a facesheet that is machine printable and is coupled to the adhesive layer on a side opposite the substrate;

wherein the adhesive layer fills in the surface relief such that there are no un-filled gaps beneath the facesheet to level the facesheet.

19. The printable structure of claim 18, wherein the facesheet includes a polymer film layer in contact with the adhesive layer; and a print-receptive topcoat.

20. The printable structure of claim 19, wherein the polymer film has a thickness of from 0.1 mils to 6 mils.

* * * * *